2 Sheets—Sheet 1.
W. A. VAN DEUSEN.
SEEDER ATTACHMENT FOR HARROWS.
No. 541,904. Patented July 2, 1895.
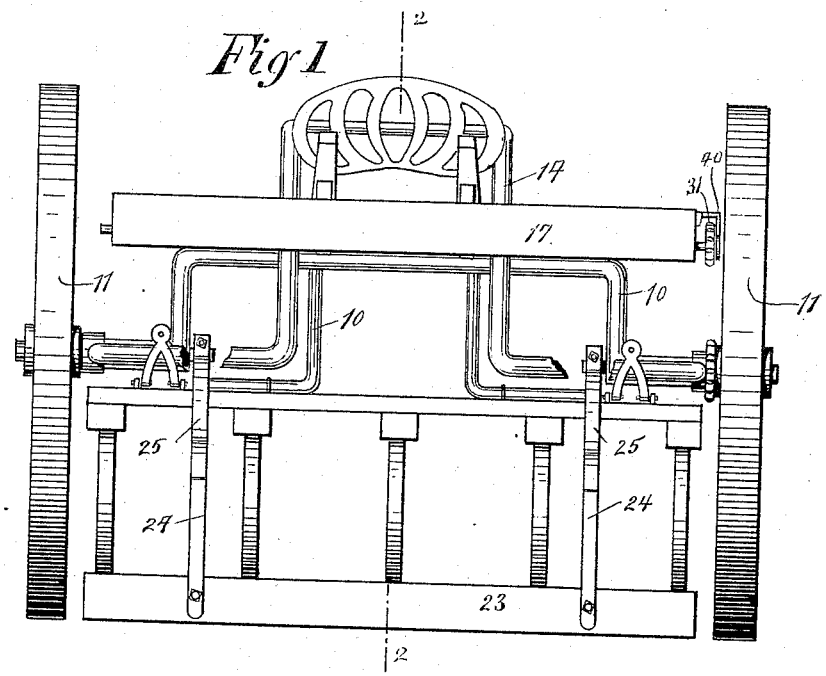
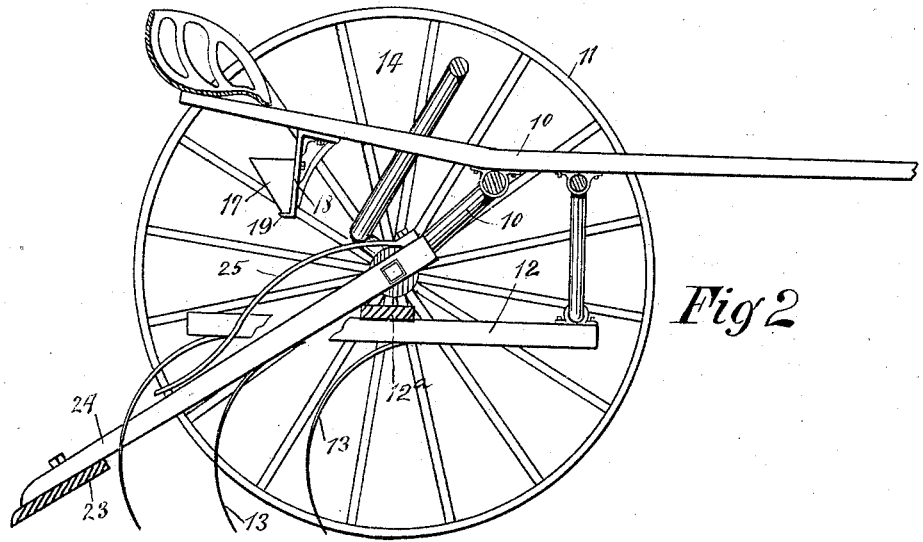
WITNESSES:
Bertram H Saunders
Edward L Coman
INVENTOR
William A. Van Deusen
BY
W. B. Hutchinson
ATTORNEY.

(No Model.) 2 Sheets—Sheet 2.
W. A. VAN DEUSEN.
SEEDER ATTACHMENT FOR HARROWS.
No. 541,904. Patented July 2, 1895.
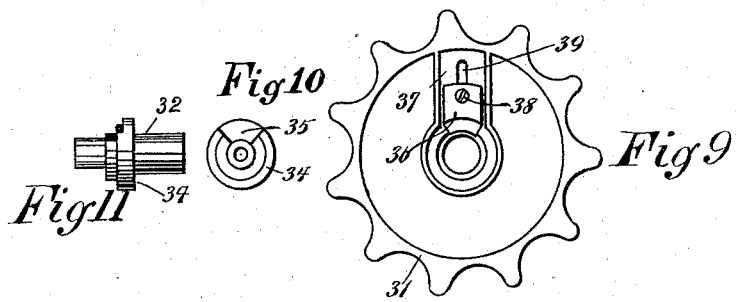
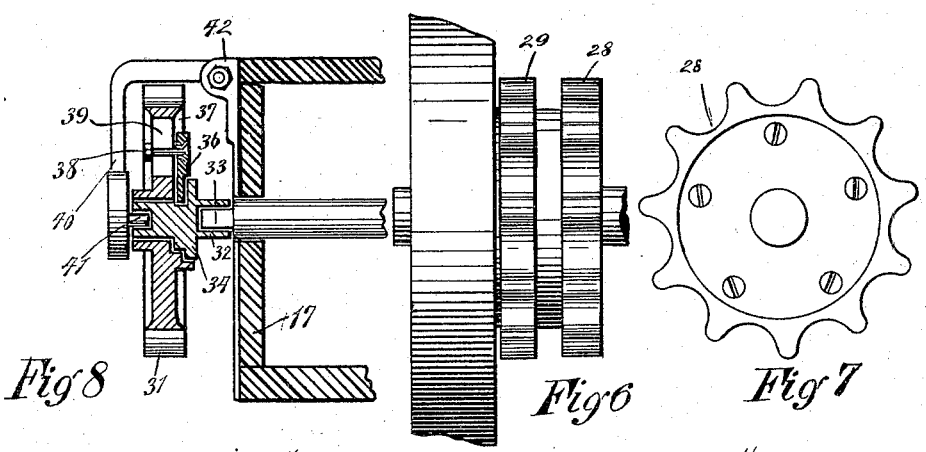
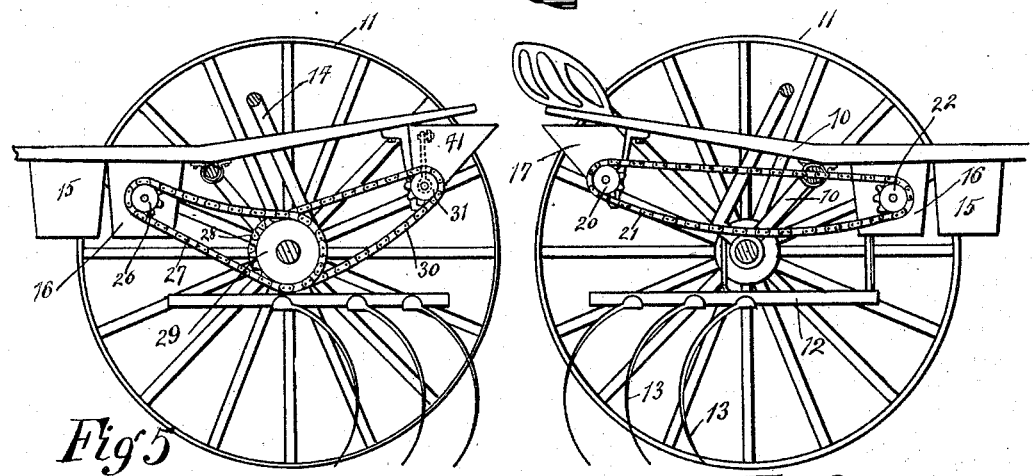
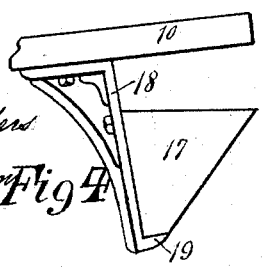
WITNESSES: Bertram H. Saunders, Edward L. Loman
INVENTOR William A. Van Deusen
BY W. P. Hutchinson
ATTORNEY.

UNITED STATES PATENT OFFICE.

WILLIAM A. VAN DEUSEN, OF SPROUT BROOK, NEW YORK.

SEEDER ATTACHMENT FOR HARROWS.

SPECIFICATION forming part of Letters Patent No. 541,904, dated July 2, 1895.

Application filed April 9, 1895. Serial No. 545,044. (No model.)

*To all whom it may concern:*

Be it known that I, WILLIAM A. VAN DEUSEN, of Sprout Brook, Montgomery county, New York, have invented new and useful Improvements in Seeder Attachments for Harrows, of which the following is a full, clear, and exact description.

My invention relates to improvements in seeder attachments for harrows, and my invention is particularly adapted for use in connection with what is known as "The New American Harrow and Seeder." As these machines have generally been made the grain seeder and grass seeder hoppers have been located in front of the harrow teeth, and consequently the grass seed when dropped has been too deeply buried, so that much of it is wasted and never sprouts.

The object of my invention is to obviate this difficulty and place the grass seeder in such a way that the grass seed will be dropped behind the harrow teeth, and also to provide a leveling device, which acts in the nature of a roller, and leaves the ground smooth, and which also slightly covers the grass seed so that it shall mature and grow readily.

A further object of my invention is to arrange the driving mechanism of the machine in a simple and efficient manner, and also to construct the mechanism in such a way that it may be very conveniently applied to machines already built in the usual manner.

To these ends my invention consists of certain features of construction and combination of parts, which will be hereinafter described and claimed.

Reference is to be had to the accompanying drawings, forming a part of this specification, in which similar figures of reference indicate corresponding parts in all the views.

Figure 1 is a broken rear elevation, with parts of the machine removed, showing the harrow with my improvement attached. Fig. 2 is a vertical cross section on the line 2—2 of Fig. 1. Fig. 3 is a sectional elevation showing the manner in which the seed boxes are arranged and the seeding mechanism driven, the leveling device being removed in this view. Fig. 4 is a broken detail view illustrating the manner of attaching the seed boxes to the machine. Fig. 5 is a view similar to Fig. 3, but showing the opposite end portion of the machine, and illustrating the application of my improvements to an old machine, or one already built. Fig. 6 is a broken plan view of the double sprocket wheel used in applying my device to an existing machine. Fig. 7 is an end or side view of the double sprocket wheel. Fig. 8 is an enlarged detail, longitudinal section of the driving sprocket wheel, which is attached to the grass seeder shaft of an existing machine. Fig. 9 is a detail end or side view of the sprocket wheel shown in Fig. 8; and Figs. 10 and 11 are end and plan views, respectively, of the clutch shaft and collar used to connect the sprocket wheel shown in Fig. 9 with the shaft of the grass seeder.

The machine is provided with the usual frame 10, which is mounted on wheels 11, and has supported on it the customary harrow frame 12, having the usual teeth 13, the harrow teeth being raised and lowered by the lever 14, and the machine is also provided with the usual fertilizer box 15, and grain seeder box 16.

The aforesaid parts are not shown or described with great particularity because they are now in common use, and form no part of my invention.

In carrying out my invention, I arrange the grass seeder 17 at a point above the harrow teeth 13, so that when the machine is in motion the grass seed will drop slightly behind the teeth 13, and, while the seeder may be supported on the frame in any convenient way, I prefer to use brackets 18, which are secured to the frame and have bent lower ends 19 extending beneath the seeder bottom, and the seeder is bolted to these brackets.

The shaft of the seeder, which drives the ordinary feed mechanism, is provided with a sprocket wheel 20, driven by a chain 21, connecting with a sprocket wheel 22 on the shaft of the grain seeder 16, which is driven in the usual way from one of the wheels 11, this way being illustrated in Fig. 5, and described presently. This method of driving the grass seeding mechanism is used when a new machine is constructed in accordance with my ideas, but in applying the devices to an existing machine the arrangement illustrated in Figs. 5 to 11, and hereinafter described, is used.

In both the new and old machines I use a leveler 23, which is arranged on an incline behind the teeth 13, and which is dragged over the ground so as to level the same, crush the clods and slightly cover the grass seed. This leveler is supported on arms 24, which are hung on the axle of the machine, and the arms are pressed downward by springs 25, which extend beneath the lever 14, and which by yielding permit the leveling device to pass easily over an obstruction. The arms 24 are raised and lowered with the frame 12, as the latter is provided with a cross bar $12^a$ which extends beneath the arms.

Fig. 5 shows the means of driving the seeder shaft, and the shaft, as illustrated, has a sprocket wheel 26, which is driven by a chain 27, connecting with the sprocket wheel 28 on the hub of one of the wheels 11, and where my attachments are used I bolt a second sprocket wheel 29 to the sprocket wheel 28, although the two wheels may be made integral if desired. The second part 29 of the double sprocket wheel drives a chain 30, which connects with a sprocket wheel 31, and this drives the seeder shaft, being mounted on the clutch shaft 32, which is a short shaft having one end recessed to fit the squared end 33 of the grass seeder shaft. See Fig. 8. The shaft 32 is provided with a collar 34, which fits against the sprocket wheel 31, and has in one side a recess 35 to receive the lock plate, or bolt 36, which slides in a way 37 on one side or end of the sprocket wheel 31, the lock plate being held in place by a bolt 38, which enters a radial slot 39 in the sprocket wheel. The object of the lock plate and clutch is to enable the grass seeder to be easily thrown out of gear when desired, which is done by sliding out the lock plate so as to move it out of engagement with the collar 34.

The shaft 32 and its sprocket wheel are steadied by an angle bracket 40, one end of which is provided with a stud 41, which enters a recess in the outer end of the shaft 32, (see Fig. 8) while the upper end of the bracket is bolted to a lug 42, which is usually found on the end plate of the seeder 17. It will thus be seen that the seeder 17 may be easily attached to the ordinary frame by means of the brackets 18, and that the double sprocket wheel 28—29 may be easily formed, while the connection between the said sprocket wheel and the seeder may be easily made by the chain 30 and the sprocket wheel 31, all of the parts being arranged so that they can be quickly removed when desired.

Having thus described my invention, I claim as new and desire to secure by Letters Patent—

The combination with the harrow and its supporting frame mounted on wheels, of the grain seeder delivering in front of the harrow, the grass seeder delivering behind the harrow teeth, the double sprocket wheel on one of the main wheels, and drive chains extending from the double sprocket wheel to the grain and grass seeders, respectively, substantially as described.

WILLIAM A. VAN DEUSEN.

Witnesses:
WARREN B. HUTCHINSON,
M. A. FILKINS.